US008707306B1

(12) United States Patent  
Yu et al.

(10) Patent No.: US 8,707,306 B1  
(45) Date of Patent: *Apr. 22, 2014

(54) IMPLEMENTING USER-SELECTABLE CONCURRENT ACCESS PROTECTION MECHANISM IN A MULTI-TASKING MODELING ENVIRONMENT

(75) Inventors: Biao Yu, Ayer, MA (US); James Carrick, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 1135 days.

This patent is subject to a terminal disclaimer.

(21) Appl. No.: 11/880,936

(22) Filed: Jul. 24, 2007

Related U.S. Application Data

(63) Continuation of application No. 11/687,576, filed on Mar. 16, 2007.

(51) Int. Cl.
- *G06F 9/46* (2006.01)
- *G06F 9/50* (2006.01)
- *G06F 13/00* (2006.01)

(52) U.S. Cl.  
USPC ............ 718/100; 718/104; 711/163; 711/168

(58) Field of Classification Search  
USPC ................................................ 718/147, 150  
See application file for complete search history.

(56) References Cited

U.S. PATENT DOCUMENTS

| 5,247,675 | A   |     | 9/1993  | Farrell et al.            |
|-----------|-----|-----|---------|---------------------------|
| 7,028,119 | B2  | *   | 4/2006  | Hue ............... 710/200 |
| 7,496,594 | B1  |     | 2/2009  | Cummings et al.           |
| 2003/0145035 | A1 | * | 7/2003  | de Bonet ........ 709/102  |
| 2004/0003321 | A1 | * | 1/2004  | Glew et al. ....... 714/27 |
| 2004/0261080 | A1 | * | 12/2004 | Chan et al. ..... 719/310  |
| 2005/0172286 | A1 | * | 8/2005  | Brumme et al. ... 718/1    |
| 2006/0174248 | A1 | * | 8/2006  | Zeidman et al. .. 718/104  |
| 2007/0094430 | A1 | * | 4/2007  | Speier et al. ... 710/200  |
| 2008/0140971 | A1 | * | 6/2008  | Dankel et al. ... 711/163  |

OTHER PUBLICATIONS

Balasundaram et al., Compile-time Detection of Race Conditions in a parallel program, ICS '89 Proceedings of the 3rd international conference on Supercomputing (1989).*

Vallejo, F. et al., "Shared Memory Multimicroprocessor Operating System with an Extended Petri Net Model," IEEE Transactions on Parallel and Distributed Systems, vol. 5(7):749-762 (1994).

* cited by examiner

*Primary Examiner* — Meng An  
*Assistant Examiner* — Benjamin Wu  
(74) *Attorney, Agent, or Firm* — Harrity & Harrity, LLP

(57) ABSTRACT

A system for providing model level protection for resources holding data accessed by multiple tasks in a model is discussed. The protection occurs at the model level so that the protection mechanism does not interfere with model dynamics. Resources concurrently accessed by multiple tasks are identified so that a unified protection mechanism can be applied to the resource. A user interface may be provided which enables the selection of a particular type of protection mechanism for the data in the resource. User supplied protection mechanisms may also be implemented.

18 Claims, 13 Drawing Sheets

Memory Allocated for Model 330

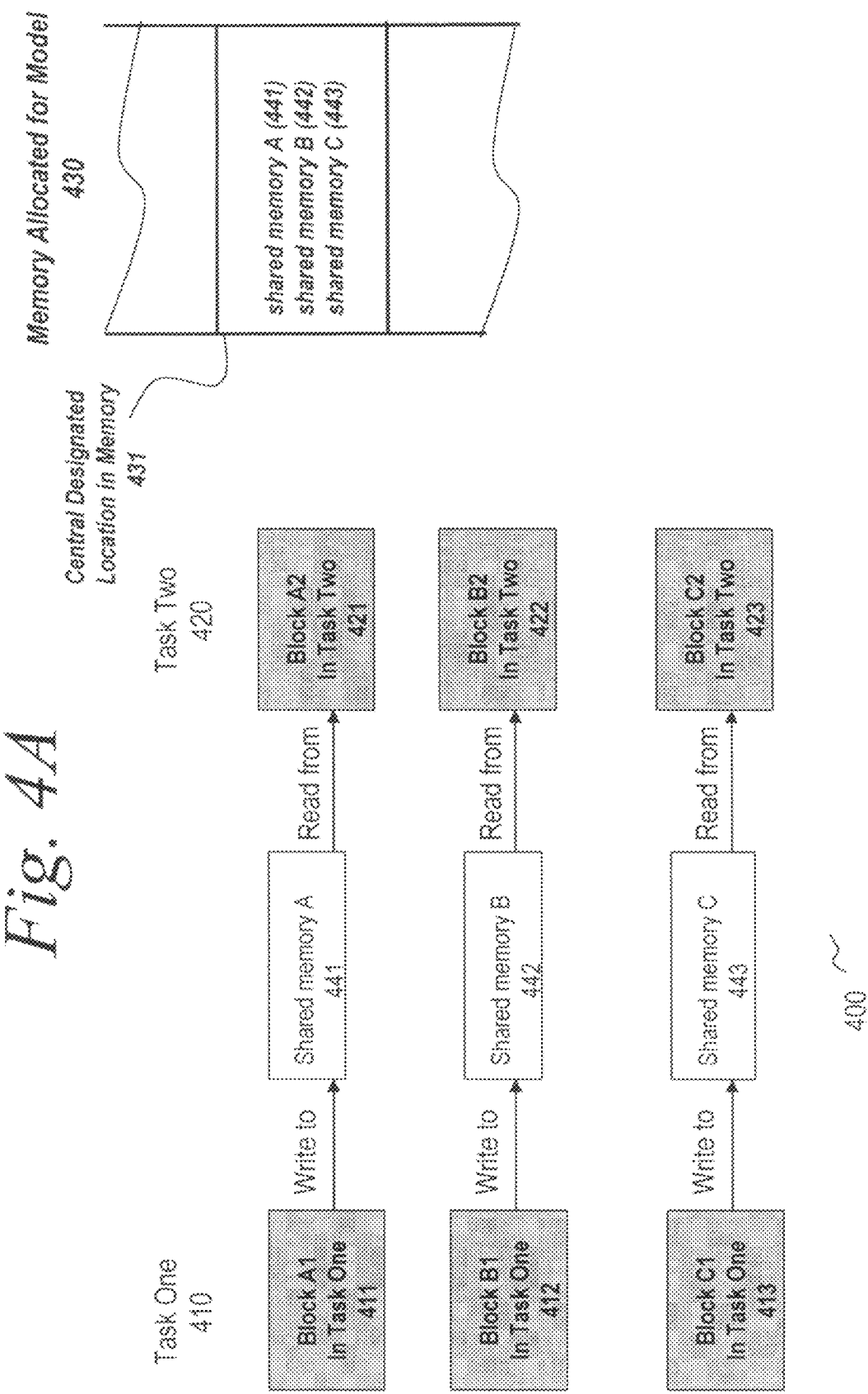

UI to set task attribute: preemption behavior

FIG. 8A

IMPLEMENTING USER-SELECTABLE CONCURRENT ACCESS PROTECTION MECHANISM IN A MULTI-TASKING MODELING ENVIRONMENT

RELATED APPLICATIONS

This application claims the benefit under 35 U.S.C. §120 as a continuation of U.S. Non-provisional application Ser. No. 11/687,576, filed Mar. 16, 2007, entitled "DATA TRANSFER PROTECTION IN A MULTI-TASKING MODELING ENVIRONMENT," the entire disclosure of which is hereby incorporated by reference for all purposes.

BACKGROUND

Technical computing environments, such as the environments provided by MATLAB® software, STATEFLOW® software and SIMULINK® software all from The MathWorks, Inc. of Natick Mass., as well as parallel state machines hybrid automata, data flow models (e.g., synchronous data flow models) and other graphical modeling formalisms such as, for example, Petri nets, provide environments for designing, simulating and executing dynamic system models. The models may be models of real-time and/or non-real-time control systems, real-time and/or non-real-time communication systems and other real time and/or non-real-time applications.

Dynamic system models may model multi-task systems that can include tasks/components that execute independently potentially at different rates and/or with different priorities. For example, in a block diagram model, the model may include blocks related to tasks in the system being modeled that execute at different rates (e.g., a first block that executes at a first rate and a second block that executes at a second rate). Blocks and/or components in a system being modeled are frequently required to write to, or read from, a memory location or other resource. In certain situations, one block/component may attempt to read from a memory location while another block/component writes to the location. When multiple blocks/components attempt to interact with a memory location at the same time, problems may arise (e.g., a block may read partially overwritten data from the memory location). For example, if the first block has a sample time that causes it to execute every 0.2 seconds and the second block has a sample time of 0.1 seconds, problems can arise if both the first block and second block are independently executing and attempting to access a shared memory location (the sample-time is the time interval at which the inputs, state, or outputs of the system are updated and/or traced as time progresses). Similarly, parallel state machine states that are active in parallel or parallel transitions may also write to the same memory location.

SUMMARY

In one embodiment a method for protecting data in a multi-tasking modeling environment includes the step of identifying at least one resource that will be accessed by at least two tasks being modeled. The method also changes the identified resource to a central designated resource. The central designated resource is protected from at least one type of concurrent access by the tasks being modeled.

In another embodiment in a multi-tasking modeling environment, a system for protecting resources includes a first and second task in a system being modeled. The first task executes at a first sample rate. The second task executes at a second sample rate. The system also includes an identified first resource that will be accessed by the first and second model tasks during an execution of the system being modeled. The system additionally includes a central designated resource to which the identified first resource is redirected. A protection mechanism is also included that protects the central designated resource from at least one type of concurrent access by the first and second tasks.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

FIG. 4A depicts the utilization of a central designated location in memory for shared memory locations used by model components in a block diagram model practicing an embodiment of the present invention;

FIG. 8A depicts a user interface used to control preemption attributes;

DETAILED DESCRIPTION

Figure 1:
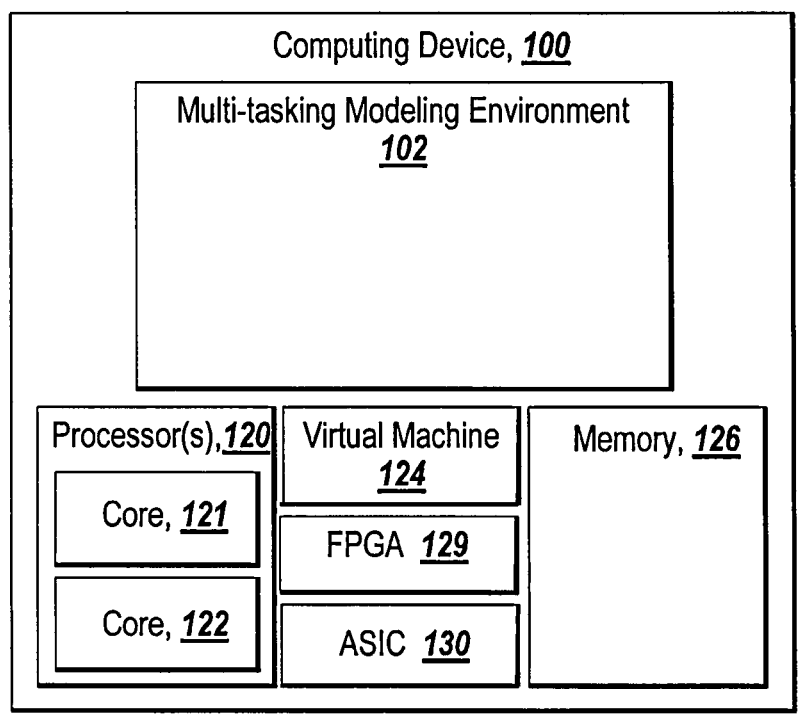
FIG. 1 depicts an environment suitable for practicing an embodiment of the present invention.

Some multi-task models may model systems where a number of tasks are operating at substantially the same time (e.g., a first block may execute a first task and a second block may execute a second task). At times, multiple tasks may attempt to interact with a memory location or other resource such as a bus, processor or processor core at the same time (e.g., the first block may attempt to write to the memory location while the second block attempts to read or write to the memory location) when the system that is being modeled operates. In case of a memory read or write, data integrity and/or data determinism may be compromised when the multiple tasks attempt concurrent access to the memory location. For example, data being read from the memory location by the first block (or task) may be in the process of being written to by the second block (or task). This problem of simultaneous and uncoordinated access to the memory location may occur, for example, in a multi-rate system being modeled when the second task is operating at a rate that differs from an operating rate for the first task. Without proper protection, data may be delivered to the first task, the second task, or to another task that is corrupted, incomplete, or otherwise incorrect or undesired.

Conventional techniques for modeling the protection of memory locations and other resources during the execution of multi-task systems use rate transition algorithms to protect data transfer locally for each case. For example, in a block diagram model which requires data transfers between two model components running at different rates, such as subsystem blocks with different sample times, a rate transition block may be inserted between the two model components. The rate transition block includes protection logic that is used to synchronize transfers between the two model components executing at different rates (speeds) and/or with different priorities. Protection logic included in rate transition blocks may take a number of forms, such as including code causing the generation/use of double buffers or the use of semaphores to handle the reading and writing of data to the shared memory location.

These conventional techniques for protecting resources in a multi-tasking system being modeled may require the insertion into the model of a local protection technique (e.g., a rate transition block) for every data transfer to a shared memory location (e.g., a protection technique may be needed for every transfer of data to and from a memory location that is of concern to a model designer). The insertion of local protection logic into the model is inefficient and may affect model dynamics (i.e., the manner in which model components interact and are executed). These local protection mechanisms may further be static, non-configurable and/or may not be extended to account for different schedulers, software environments, operating systems, hardware targets, etc.

Conventional memory protection techniques may have a further shortcoming that affects code generated using a model. For example, generated code for a specific target may include the protection code that was embedded into model code to address issues in the system being modeled, such as multiple rates. Local protection techniques that are included in generated code may limit the ability of a user of a target platform to implement his/her own preferred solution (e.g., code generated by the user or code obtained from a third party that is adapted to operate on the target platform).

Exemplary embodiments described herein provide model level protection for memory locations holding data or other resources accessed by multiple independently executing tasks in a system being modeled. The protection of the memory locations or other resources may take place at the model level so that the protection mechanism does not interfere with model dynamics. For example, in one embodiment memory locations holding data associated with multiple tasks are identified and grouped together so that a unified protection mechanism can be applied to the grouped memory location. A user interface may be provided which enables the selection of a particular type of protection mechanism for the data in the grouped memory location. For example, a user may identify one or more protection mechanisms that can be applied at the model level using one or more grouped memory locations. Exemplary implementations of user interfaces may allow users to describe multi-tasking (multi-rate) environments and to choose or suggest data transfer protection mechanisms based on characteristics of multi-tasking environments. In one implementation, a set of Application Programming Interfaces (APIs) may be provided to allow users to integrate their own rate transition solutions/protection mechanisms with models, model components, generated code, etc.

The grouping of the shared resources allows protection mechanisms, such as rate transition solutions, data transfer protection, etc., to be unified at a model level rather than requiring separate treatment (e.g., via insertion of rate transition blocks) for each data transfer between independently executing tasks and/or between executing tasks and a local memory location. The protection may also be supplied for parts of a model rather than the entire model. Because the protection mechanism is separate from model dynamics, the code of each task is independent from other tasks and is exportable. Model-level protection allows the behavior of each task to be independently or collectively simulated and/or evaluated. Model-level protection can also be scheduler-independent thereby avoiding rate transition issues associated with conventional techniques that do not employ model-level protection. Grouped memory locations can provide a data interface between different tasks and can be protected by each task. The data interface may also allow tasks to communicate with each other.

Exemplary embodiments further provide a protection mechanism that can be customized for different users, target hardware, etc., without changing the implementation of model dynamics. For example, support for multi-processors, time slicing, multi-readers, multi-writers, etc., can be added to a model without impacting the implementation of model dynamics.

FIG. 1 depicts an environment suitable for practicing an embodiment of the present invention. A computing device 100 supports a multi-tasking modeling environment 102. The computing device 100 may be a workstation, server, laptop, mainframe, PDA or other computing device equipped with one or more processors and able to support the multi-tasking modeling environment 102. The computing device 100 may have a single processor or multiple processors 120 and each of the processors may have one core or multiple cores 121 and 122. The computing device 100 includes memory 126 that is allocated to models in the multi-tasking modeling environment 102. The computing device 100 may also host one or more virtual machines 124 in which the multi-tasking modeling environment 102 may be executed. The computing device 100 may use hardware acceleration to execute the multi-tasking modeling environment 102 and may run code on different hardware such as, for example, a Field Programmable Gate Array (FPGA) 129, an Application Specific Integrated Circuit (ASIC) 130, or a Digital Signal Processor (DSP). It should be appreciated that the system being modeled may also use hardware acceleration and may run code on different hardware such as, for example, a Field Programmable Gate Array (FPGA) 129, an Application Specific Integrated Circuit (ASIC) 130, a System on a Chip (SoC) or a Digital Signal Processor (DSP).

Figure 2:
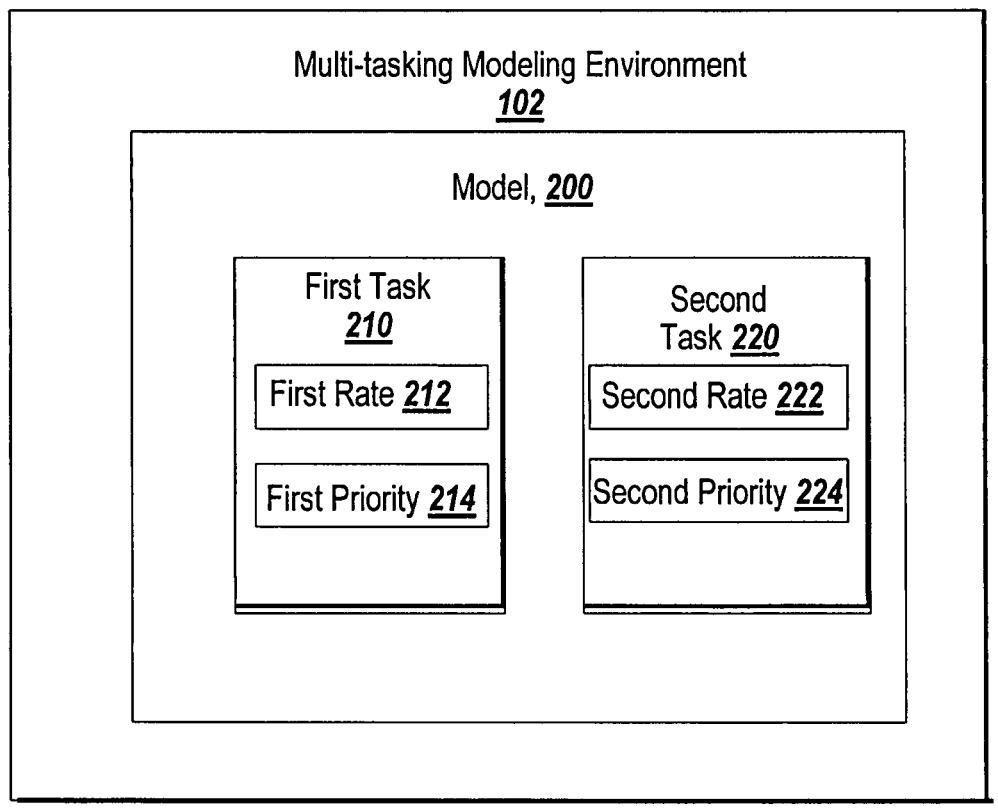
FIG. 2 depicts the modeling environment of FIG. 1 in greater detail.

FIG. 2 illustrates the multi-tasking modeling environment 102 of FIG. 1 in greater detail. The multi-tasking modeling environment 102 supports multi-rate models of systems that include tasks/components that execute at different sample rates. It will be appreciated that the multi-tasking modeling environment 102 may be any of a number of types of modeling environments which support the execution of multiple threads and/or processes in addition to block diagram modeling environments. The multi-tasking modeling environment 102 can include at least one model 200 of a system with a first task 210 and second task 220 that independently execute at a first rate 212 and second rate 222 and/or with a first priority 214 and second priority 224, respectively. The first task 210 and second task 220 may attempt concurrent access to the same shared memory location or other resources such as a bus, processor or processor core. Exemplary implementations of the multi-tasking modeling environment 102 employ protection mechanisms and/or techniques to maintain data integrity when multiple tasks/blocks attempt to interact with a shared memory location (i.e., a memory location that is shared between the multiple tasks/blocks) or other resource. The multi-tasking modeling environment 102 may be a textually-based modeling environment and/or a graphically-based modeling environment. For example, an exemplary multi-tasking modeling environment 102 is a SIMULINK® software-based environment in which a block diagram model includes a first and second block.

Figure 3A:
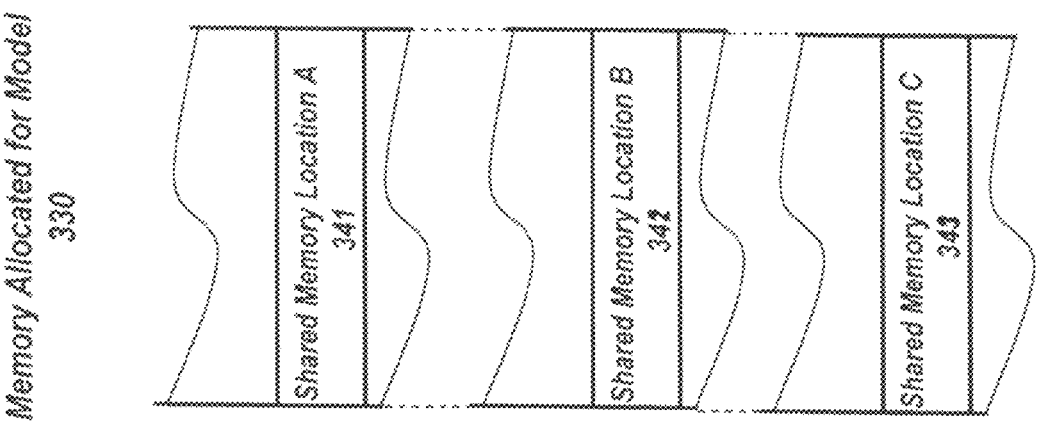
FIG. 3A (prior art) depicts model components of a block diagram utilizing conventional rate transition solutions implemented for a model at a block level.
Figure 3A:
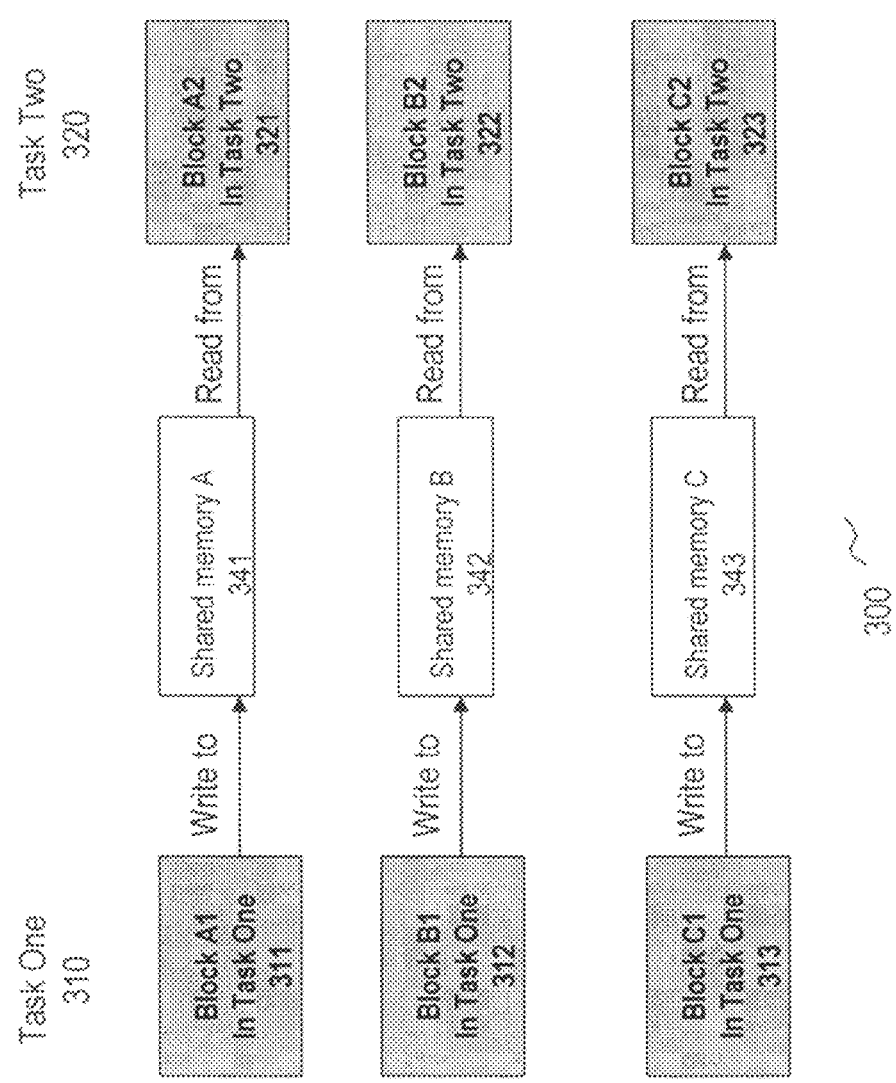

In order to better explain the differences between conventional protection mechanisms and embodiments of the present invention, a modeling environment employing conventional protection mechanisms is first examined. Although many of the examples contained herein refer to the protection of shared memory locations, it should be understood that the protection of other types of shared resources is also considered to be encompassed within the scope of the present invention, and that many of the protection techniques discussed herein are applicable to other types of shared resources in addition to shared memory locations. FIG. 3A depicts components of a system being modeled in a block diagram writing to, and reading from, shared memory locations using conventional techniques. Model 300 includes two independently executing tasks labeled as Task One 310 and Task Two 320, each with their own collection of block components. Task One 310 includes Block A1 (311), Block B1 (312) and Block C1 (313). Task Two 320 includes Block A2 (321), Block B2 (322) and Block C2 (323). Tasks 310 and 320 may execute at different sample rates or with different priority levels but share the use of one or more memory locations 341, 342, or 343. A portion 330 of the memory available to the computing device 100 has been allocated for the use of the model 300. Both Block A1 (311) from Task One (310) and Block A2 (321) from Task Two (320) access shared memory location A (341) with Block A1 writing to shared memory location A and Block A2 reading from shared memory location A. Similarly, Block B1 (312) from Task One (310) writes to shared memory location B (342) and Block B2 (322) from Task Two (320) reads from shared memory location B. Likewise, Block C1 (313) from Task One (310) writes to shared memory location C (343) and Block C2 (323) from Task Two (320) reads from shared memory location C.

In order to protect data in shared memory locations, a model designer may insert a rate transition block, or other type of block-level protection mechanism, into model 300. A rate transition block may include protection logic for a shared memory location, such as shared memory locations 341, 342, or 343. For example, the protection logic may utilize double buffers or a semaphore. The double buffers are separate buffers that may be written to and read from so as to account for the differences in sample rates between tasks. Each transfer of data to and from a shared memory location to and from a block in an independently executing task requires its own protection mechanism.

Figure 3B:
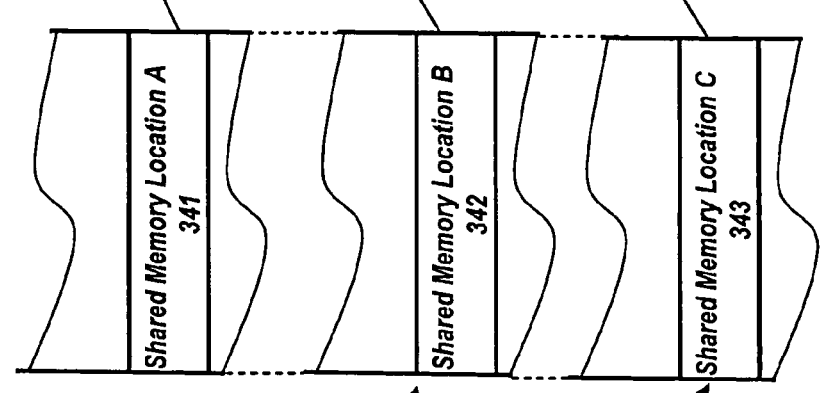
FIG. 3B (prior art) depicts the mapping of code from tasks to shared memory locations in the conventional rate transition solutions of FIG. 3A.

FIG. 3B shows an alternate view of the conventional environment of FIG. 3A by depicting the mapping of code from tasks in model 300 to shared memory locations 341, 342, 343. The code of Task One (350) includes code for Block A1 (351) that executes during the execution of the system being modeled and attempts to write to a shared memory location. Following execution of the code for Block A1 (351), protection logic 352 associated with block A1 executes as part of an attempt to write to shared memory location A 341. Similarly, the code of Task Two (360) includes code for Block A2 (362) that attempts to read from shared memory location A 341. However, before the read operation called for by the execution of the code for Block A2 (362) can take place, the protection logic 361 associated with Block A2 must first execute. It will be appreciated that the specific details of the protection logic 352 and 362 will vary depending upon the protection mechanism being employed. For example, in the event a double buffer is being employed, the protection logic may check to see which buffer is a read buffer and which buffer is a write buffer and whether the respective buffers are available. Likewise, in the case of a semaphore, the protection logic may check the condition of a flag authorizing a read or write operation.

Continuing the discussion of FIG. 3B, in the code for Task One (350) the code of Block B1 (354) and Block C1 (357) attempt write operations to shared memory location B (342) and shared memory location C (343) respectively. The execution of the code for Block B1 (354) causes the execution of the associated protection logic (355) and the execution of the code for Block C1 (357) causes the execution of the associated protection logic 358. The depicted code for other blocks 353 is included to illustrate the point that not all of the code executing for Task One causes a write operation to a shared memory location. In the code for Task Two (360) the code of Block B2 (365) and Block C2 (368) attempt read operations from shared memory location B (342) and shared memory location C (343) respectively. The execution of the code for Block B2 (365) causes the execution of the associated protection logic (364) and the execution of the code for Block C2 (368) causes the execution of the associated protection logic 367. The depicted code for other blocks 363 is included to illustrate the point that not all of the code executing for Task Two causes a read operation from a shared memory location.

As can be seen from FIG. 3B the conventional block-level protections embed the protection logic within the task code. Protection logic may be embedded for each read or write operation to a shared memory location. As a result, code generation based on the model 300 generates code that includes the embedded protection logic thus limiting the customizability of protection mechanisms for generated code for an end user.

Exemplary embodiments identify one or more memory locations holding data or other resources that are to be accessed by more than one task/thread during the execution of the system being modeled (the term "task" as used herein should be understood to encompass independently executing tasks, threads, blocks or other components in a multi-tasking system being modeled). Exemplary embodiments perform this identification at the time of the model compilation or during code generation. A number of mechanisms may be employed to perform the identification. For example, task and/or sample time information may be added to memory attributes. Exemplary embodiments may then leverage the information to determine which memory locations are being concurrently accessed. For example, a task index may be set for all memory locations accessed by code with the tasks grouped by rate. Memory locations determined to be concurrently accessed by more than one task may be associated with a central designated location in memory that is protected with a protection mechanism. This central designated location forms a data interface between the different tasks. It should be appreciated that the identified memory locations may also be protected without being associated with a central designated location in memory by recording the current memory location that is determined to be currently accessed by more than one task and applying a protection mechanism to the determined location. Other types of resources determined to be concurrently accessed by more than one task may similarly be protected with a protection mechanism.

FIG. 4A depicts an exemplary implementation that utilizes a central designated location in memory 431 to provide model-level protection. Shared memory location A (441) which is accessed by Block A1 (411) from Task One 410 and Block A2 (421) from Task Two 420, shared memory location B (442) which is accessed by Block B1 (412) from Task One (410) and Block B2 (422) from Task Two (420), and shared memory location C (443) which is accessed by Block C1 (413) from Task One (410) and Block C2 (423) from Task Two (420), are identified and moved to a central designated location in memory 431.

Figure 4B:
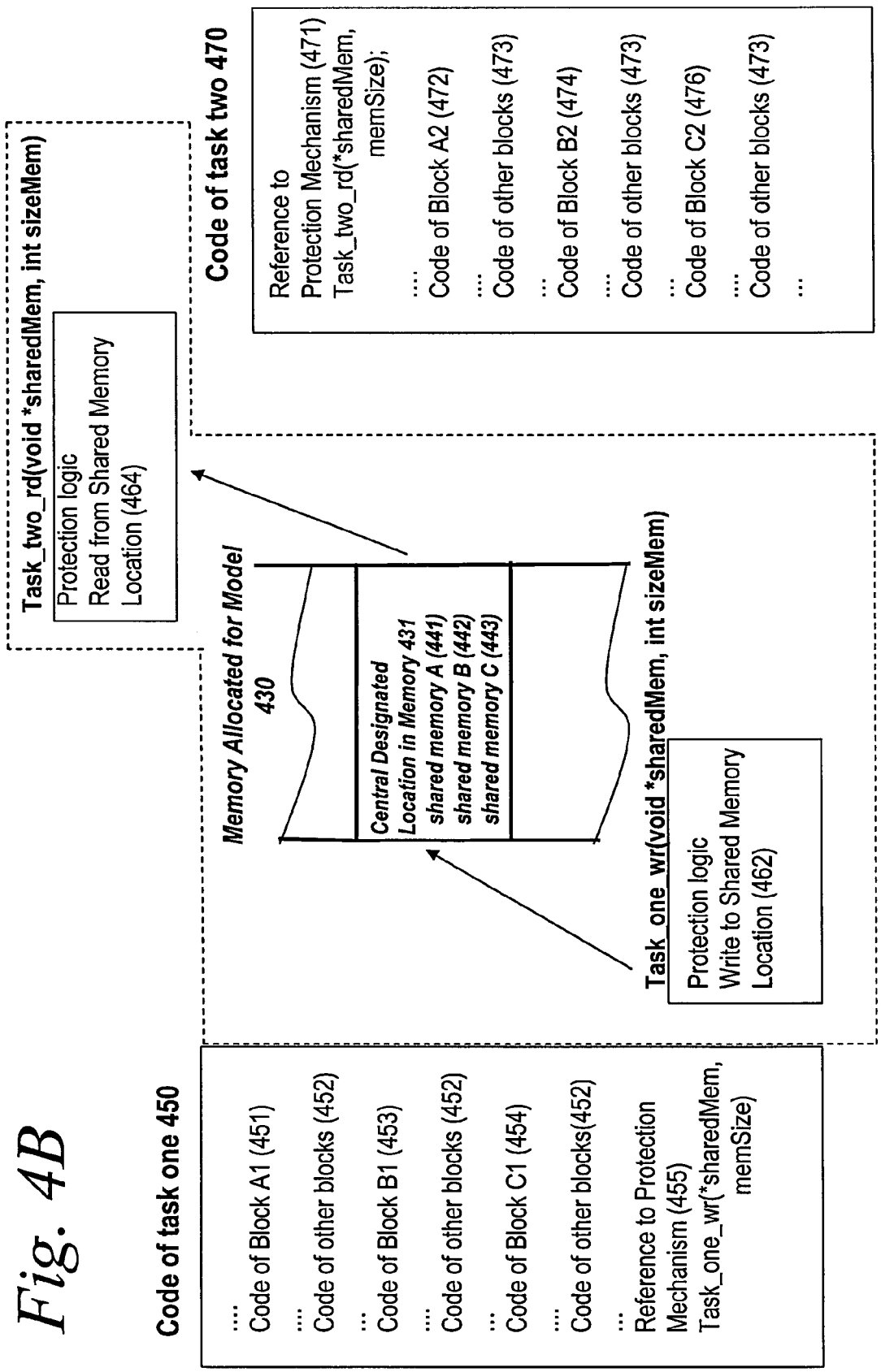
FIG. 4B depicts the usage of model-level protection mechanisms by the model of FIG. 4A.

FIG. 4B depicts the usage of model-level protection mechanisms by the model of FIG. 4A. The code of Task One 450 includes code for Block A1 (451), code for Block B1 (453) and code for Block C1 (454) all of which attempt to write to the grouped central designated location in memory 431 which includes shared memory location A (441), shared memory location B (442) and shared memory location C (443). The code of Task One 450 also includes code for other blocks 452 the execution of which does not require access to shared memory locations 441, 442, 443. As discussed above, conventional techniques may use block-level protection logic for each code segment of a task that is attempting to access shared memory. In contrast, exemplary embodiments, such as the embodiment of FIGS. 4A and 4B the code of Task One 450 includes only a reference 455, such as a pointer, to a remotely located protection mechanism, such as protection logic 462, for the central designated location in memory 431. Code of Task One 450 that attempts to access the central designated location in memory 431 utilizes the reference 455 to invoke the protection logic 462. Thus, for example, for the model components depicted in FIG. 4B, the execution of the code for Block A1 (451), code for Block B1 (453) and code for Block C1 (454) attempting to write to a shared memory location would utilize the reference 455 to the protection mechanism (the function Task_One_wr that is located remotely from the code of Task One (450)).

Similar to Task One, any read operations in Task Two caused by the execution of the code for Block A2 (472), code for Block B2 (474) and code for Block C2 (476) utilize the reference 471 to the remotely located read protection logic 464 (e.g.: Task_two_rd) rather than including the protection logic within the code of Task Two 470. It should be noted that although the model depicted in FIG. 4B has been discussed as having one task performing only write operations and another task performing only read operations to shared memory locations, tasks performing a mixture of both read and write operations to shared memory locations may also be utilized in other exemplary embodiments. In another embodiment, one task may share memory with multiple tasks or one shared memory may be accessed by more than two tasks. It should further be understood that the protection is not required to be by reference.

The separation of the protection mechanism/protection logic from task code provides a number of benefits. For example, separation of the protection mechanism from the task code allows the protection mechanism to be switched without altering the model dynamics. Additionally, the separation of the protection mechanism/protection logic from the task code allows code to be generated from the model that does not include the protection logic. The protection code may be generated as a separate identifiable module or code segment that may be replaced by a user. The generated protection code may be a function, procedure, a method, a macro, etc. written in at least one or a combination of: C, C++, Java, Java bytecode, a hardware description language, or assembly code. This separate generation of the protection code allows a user of the generated code to supply their own protection mechanism for the code and/or to select a protection mechanism during code generation. As a result, the protection mechanism can be easily customized for different customer and/or target hardware without changing the implementation of model dynamics. The separation of the protection mechanism from the algorithm code of each task also results in the tasks being independent from other tasks and exportable. Also, in one embodiment, different protection mechanisms can be chosen for different multitasking environments. The model-level protection mechanism also provides flexibility to simulate and generate scheduler or environment-independent code. Support for multi-processors, time slicing, or a multi reader/writer can be added without impacting the implementation of model dynamics. For example, some solutions may require the use of more than two buffers and the use of a model-level solution allows this decision to be made at the model level rather than the task level.

The use of a centralized model level protection mechanism may also prove to be more efficient than conventional techniques as instead of protection being provided for each data transfer separately, data transfer is protected at the model level for each task. As a result, instead of running every time data is transferred between two tasks, the protection mechanism only runs once for each task. There may also be less memory usage in some embodiments as there is only one set of rate transition control flags for each task. Additionally, the separation of the protection mechanism from the model dynamics allows the behavior of each task to be simulated or evaluated independently.

Model-level protection mechanisms may be added by embodiments of the present invention to control the access of the independently executing tasks to the identified memory locations, central designated locations in memory or identified resources. Any of a number of conventional protection mechanisms may be utilized to protect the identified/central designated location in memory or identified resources. For example, the protection mechanism may be a double read/write buffer holding copies of the data that is to be accessed by the tasks during execution of the system being modeled. A pointer to the buffers indicates which buffer may currently be read from while the other buffer is available to be written. Alternatively, the protection mechanism may be a semaphore, a flag which indicates the availability of the designated location. A task takes a semaphore before starting to write to a shared memory location, and then releases the semaphore after completing the write operation. Another task will only read from the shared memory location if the semaphore controlling the location has not been taken by some other task. Similarly, the protection mechanism may be operating system-based with the operating system controlling access to the identified memory locations, central memory locations or other identified resources. Likewise the protection mechanism may be hardware-based such as by selectively disabling a hardware interrupt to prevent unwanted access to the identified memory locations, central designated memory locations or other identified resources.

Figure 5:
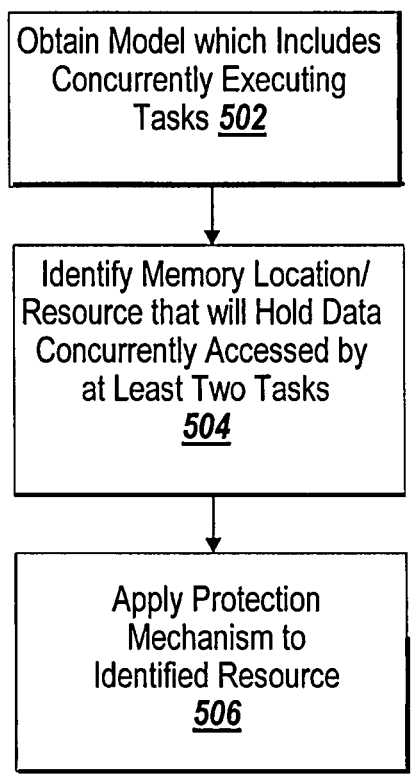
FIG. 5 is a flowchart illustrating exemplary processing that may be followed by an embodiment of the present invention to protect data in a multi-tasking modeling system.

FIG. 5 is a flowchart illustrating exemplary processing that may be followed by an embodiment to protect data in a multi-tasking modeling system. The processing may begin by obtaining a model that models concurrently executing tasks (step 502). Memory locations or other resources that will be accessed by at least two concurrently executing tasks are then identified (e.g.: shared memory location A (441), shared memory location B (442) and/or shared memory location C (443) in FIG. 4B) (step 504). Model references to the identified location/resource may then be changed to reference a central designated memory location (e.g. central designated location in memory 431 in FIG. 4B) or central designated resource or may be protected without altering a reference. A protection mechanism may then be applied to the identified resource (e.g.; protection logic 462 and 464 in FIG. 4B) (step 506). The protection mechanism may be, for example, software-based, hardware-based or operating system-based or another type of protection mechanism.

Figure 6:
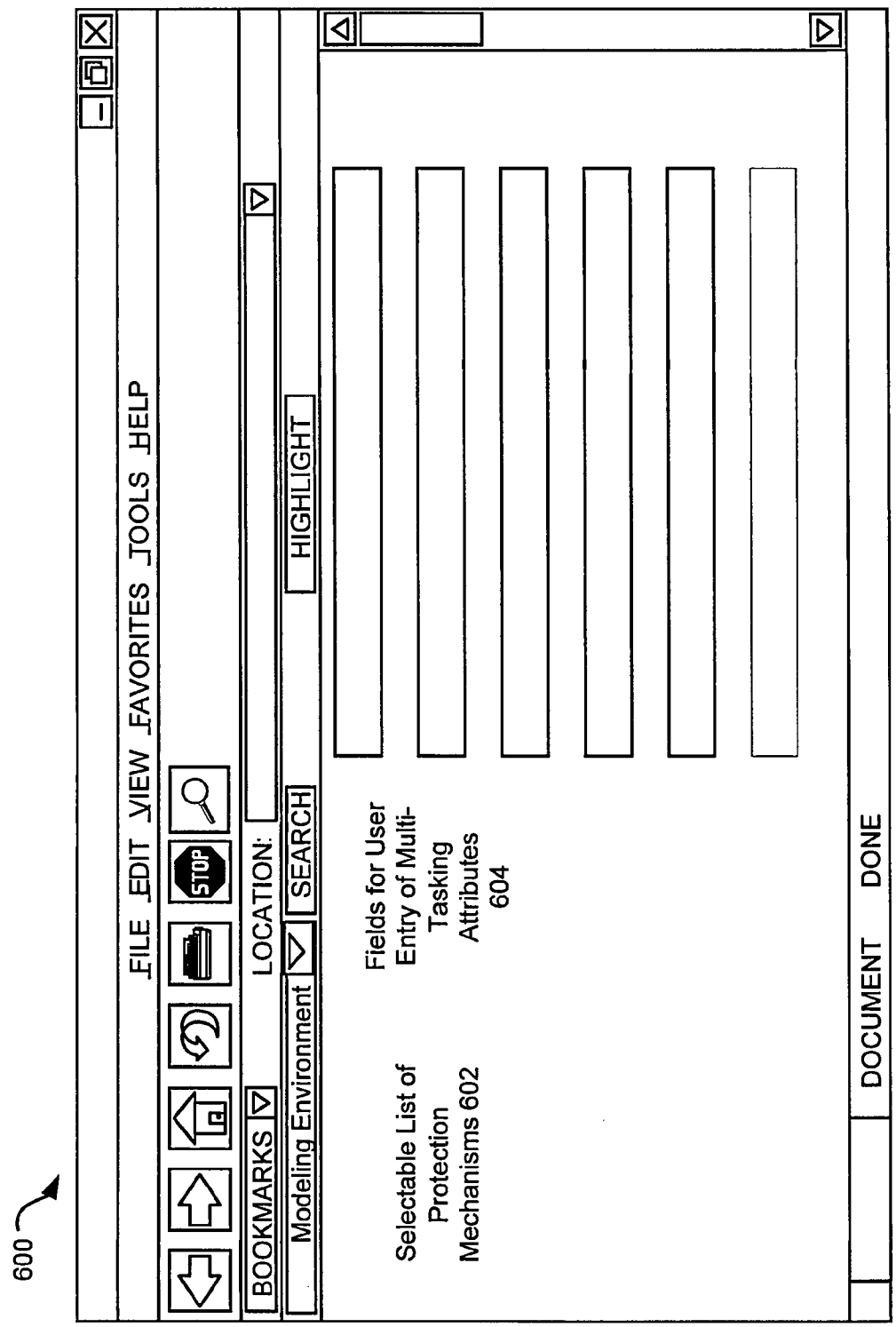
FIG. 6 depicts an exemplary user interface that may be utilized in conjunction with an embodiment of the present invention.

The application of the protection mechanism to the identified memory location, central designated location in memory or other identified resource may be performed programmatically without the participation of a user. Alternatively, in one embodiment, a user interface may be added to the multi-tasking modeling environment that enables user involvement in the selection of the protection mechanism. FIG. 6 depicts an exemplary user interface 600 that may be utilized in conjunction with an embodiment of the present invention. The user interface 600 may present a user with a list of different protection mechanisms for selection 602. In another embodiment, the user interface may allow user input for fields 604 related to multi-tasking attributes of real-time operating systems, hardware targets, or tasks. Examples of these attributes may include whether a task is preemptive, whether the OS supports time slicing or not, whether two tasks are concurring and the priority of task. Once the input has been entered, the user interface may suggest a protection mechanism or automatically apply a data transfer protection solution. In another embodiment, the user interface may enable the user to identify and apply their own protection solution to the designated location.

Figure 7:
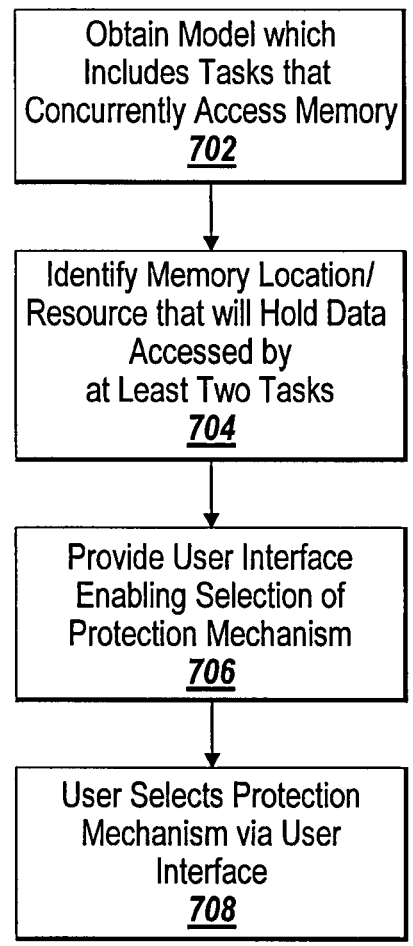
FIG. 7 is a flowchart illustrating exemplary processing that may be followed by an embodiment of the present invention to provide and use a user interface enabling the selection of a protection mechanism in a multi-tasking modeling environment.

FIG. 7 is a flowchart illustrating exemplary processing that may be followed by an embodiment to provide and use a user interface enabling the selection of a protection mechanism in a multi-tasking modeling environment. The sequence begins with the obtaining of a model modeling tasks that independently execute concurrently. (step 702). Memory locations that hold data or other resources that will be concurrently accessed by at least two tasks during task execution are then identified (step 704). The identified memory locations or resources may be grouped as discussed above. A user interface may be provided that enables the selection by a user of a protection mechanism that is to be applied to the identified memory locations or resources in order to protect the task data (step 706). In some embodiments, the user interface may request information from the user regarding the multi-tasking modeling environment prior to presenting a list of protection mechanisms to a user. For example, the user interface may suggest a protection mechanism to a user following a user indication of an attribute related to a task, a hardware target or a real-time operating system. The user interface may also allow the user to identify their own protection mechanism. The user then selects a protection mechanism for application to the designated location (step 708). In one embodiment, the user interface may also suggest changes in the OS.

Figure 8A:
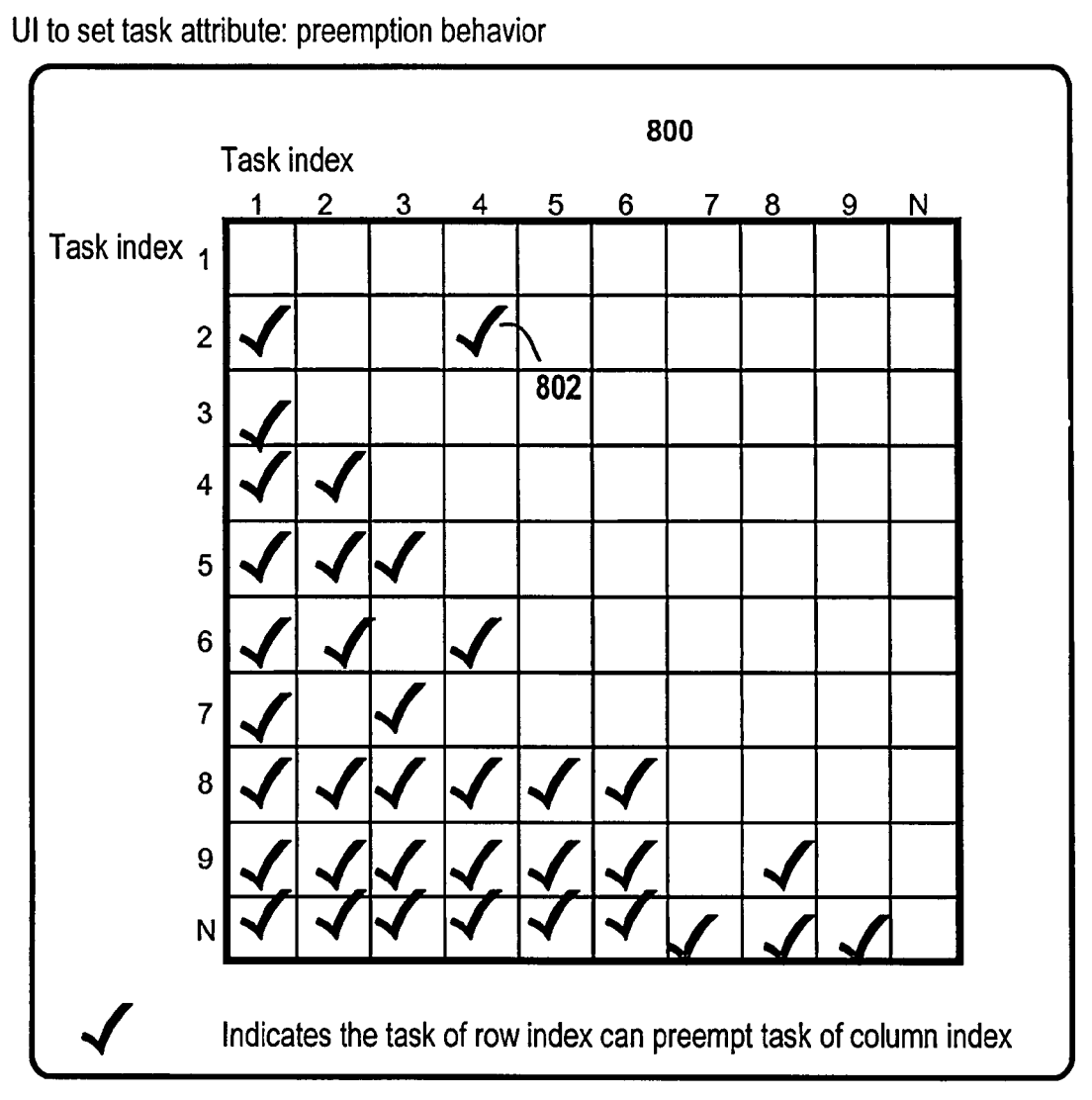
Figure 8B:
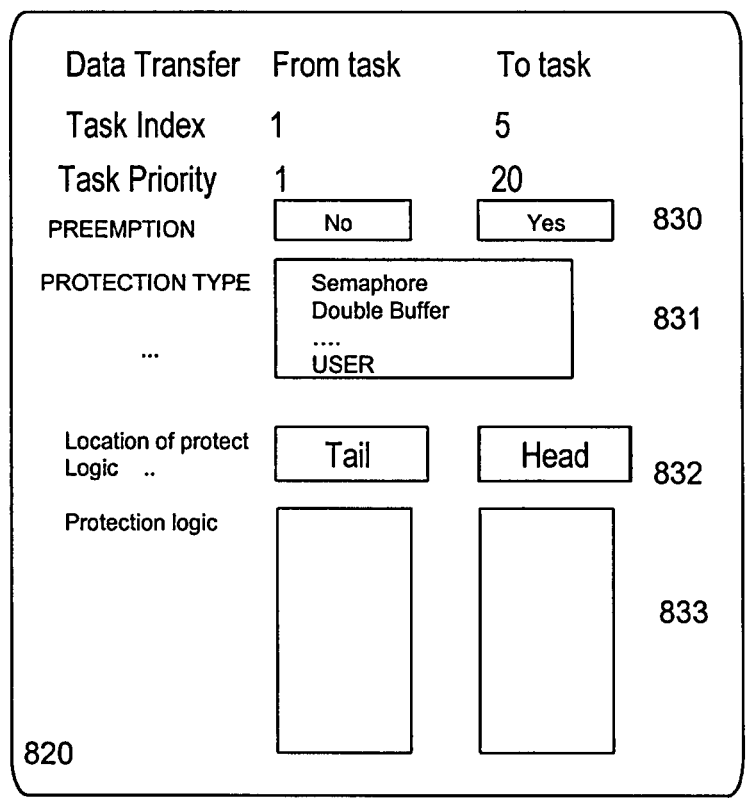
FIG. 8B depicts a user interface used to control data transfer between tasks sharing memory locations.

FIGS. 8A-8B depict exemplary user interfaces that may be utilized to control the manner in which the central designated location in memory is protected. FIG. 8A depicts an exemplary user interface 800 that may be used to set task attributes that control preemption behavior (i.e.: which task can preempt another from accessing a shared memory location). If a task whose index is N can preempt a task whose index is M, then a user can check the cell of the table on row N and column M. For example, if task '2' can preempt task '4', then the cell in table on row 2, column 4 is checked 802. FIG. 8B depicts another exemplary user interface 820 allowing a user to control data transfer between tasks sharing memory locations. The user is able to control whether memory access is preemptable 830, can specify the type of protection 831, can specify the location of the protection 832, and provide their own custom protection logic 833.

Figure 9:
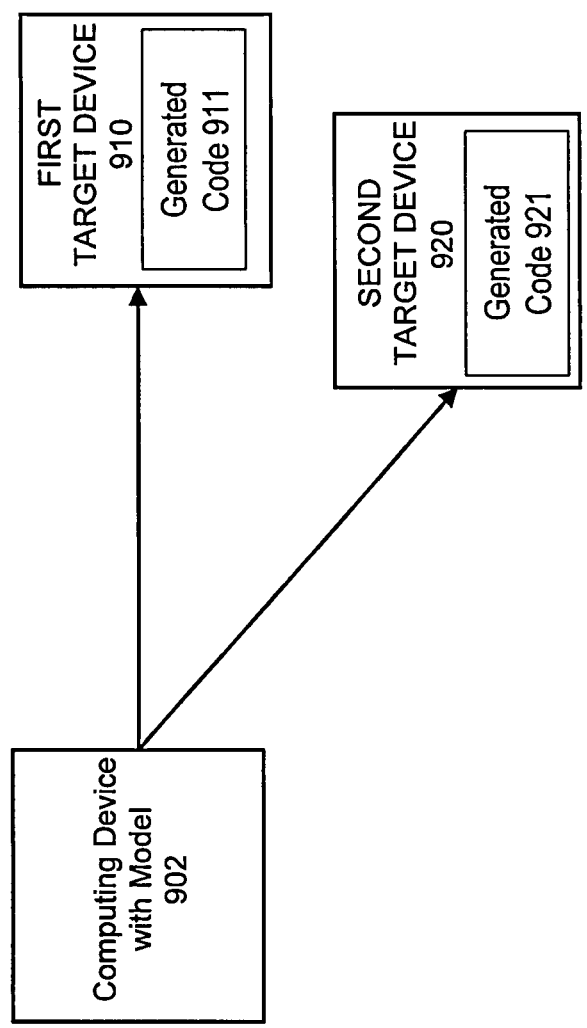
FIG. 9 depicts the transmission of generated code to target devices.

As noted above, one of the features of the present invention is the ability to generate code for target devices from a model that does not result in the generated code including the protection logic from the model. FIG. 9 depicts the generation of code to target devices. A computing device that includes a modeling environment with a model 902 generates code based on the model. The generated code may be generated for a specific target device such as the first target device 910 and the second target device 920. The generated code 911 for the first target device is device-specific and allows a user of the first target device to add their own preferred protection mechanism for shared memory locations. Similarly, the generated code 921 for the second target device is also device-specific and allows a user of the second target device to add their own preferred protection mechanism for shared memory locations. In one embodiment, code may also be generated for the protection mechanism in a separate identifiable module, fragment, container or code segment from the remainder of the model code so as to facilitate its examination and/or replacement by a user.

Figure 10:
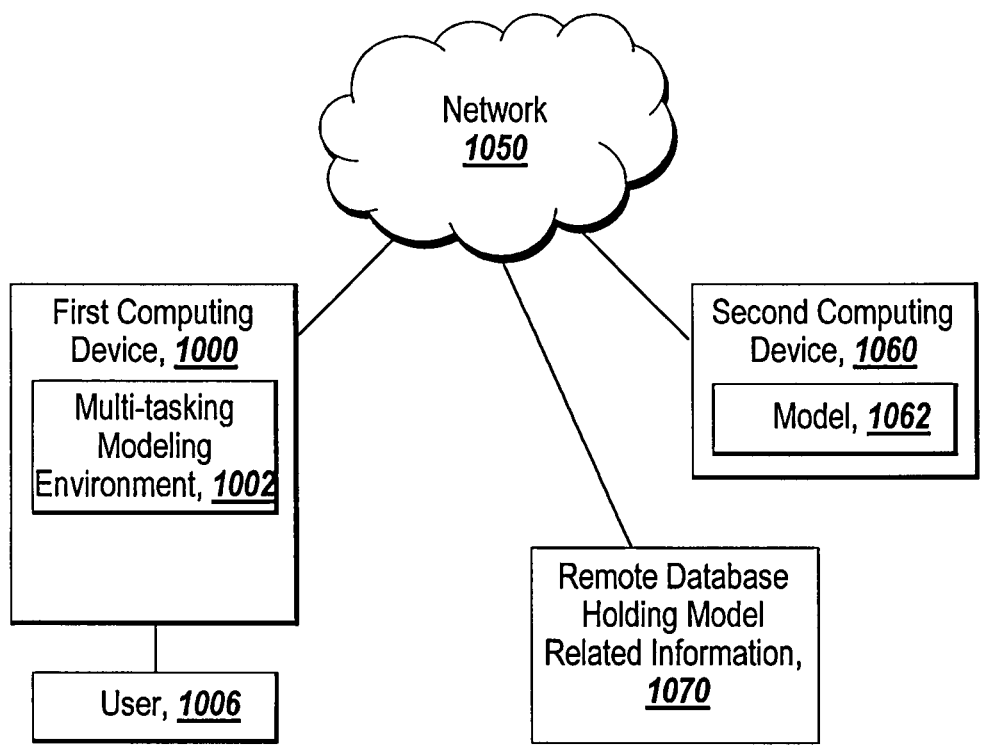
FIG. 10 depicts an alternative distributed environment suitable for practicing an embodiment of the invention.

It will be appreciated that the embodiments of the present invention may be practiced in a number of differently configured environments including the alternate distributed environment depicted in FIG. 10. A first computing device 1040 may communicate over a network 1050 with a second computing device 1060 using a number of different mediums and configurations. The network may be a Local Area Network (LAN), a Wide Area Network (WAN), an intranet, the Internet, a wireless network and/or a telephone line, or some other type of network allowing the first computing device 1040 to communicate with the second computing device 1060. The first computing device 1000 supports a multi-tasking modeling environment 1002 and is accessible to a user 1006. The multi-tasking modeling environment 1006 may retrieve a model 1062 from the second computing device 1060. Upon its receipt at the multi-tasking modeling environment 1002, the model 1062 may be examined and any shared resources/memory locations holding data that are to be concurrently accessed by more than one task being modeled may be identified and moved to a central designated resource/location in memory. The distributed environment may also include a remote database holding model-related information 1070.

The present invention may be provided as one or more computer-readable programs embodied on or in one or more mediums. The mediums may be a floppy disk, a hard disk, a compact disc, a digital versatile disc, a flash memory card, a PROM, an MRAM, a RAM, a ROM, or a magnetic tape. In general, the computer-readable programs may be implemented in any programming language. Some examples of languages that can be used include MATLAB, FORTRAN, C, C++, C#, Python or Java. The software programs may be stored on or in one or more mediums as object code. Hardware acceleration may be used and all or a portion of the code may run on a FPGA, an ASIP, or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method comprising:
   identifying a resource that is concurrently accessed by at least two tasks during an execution of a model of a multi-tasking dynamic system,
      each task of the at least two tasks being associated with respective task code to implement a functionality of the task during the execution of the model,
      identifying the resource being based on task time information or sample time information associated with the at least two tasks, and
      identifying the resource being performed by a computer;
   associating the resource with a central resource as a group,
      associating the resource with the central resource being performed by the computer;
   modifying, based on associating the resource with the central resource as the group, the task code associated with each task of the at least two tasks to access the central resource to implement the functionality of the task during the execution of the model,
      modifying the task code being performed by the computer;
   determining a protection mechanism to protect the central resource from being concurrently accessed by the at least two tasks during the execution of the model,
      determining the protection mechanism being performed by the computer, and
      determining the protection mechanism including:
         providing a user interface that enables a user to input a selection of the protection mechanism by one or more of:
            selecting the protection mechanism from a list of protection mechanisms available for protecting the central resource from being concurrently accessed by the at least two tasks, or
            entering, via one or more input fields, an input related to one or more of:
               a multi-tasking attribute associated with a real-time operating system,
               a hardware target, or
               a specified task, and
         identifying, based on receiving the selection, the protection mechanism; and
   protecting the central resource, using the protection mechanism, during the execution of the model,
      protecting the central resource being performed by the computer.

2. The method of claim 1, where protecting the central resource includes:
   providing a data interface that enables communication between the at least two tasks during the execution of the model.

3. The method of claim 1, where protecting the central resource includes:
   providing at least one of:
      a double buffer associated with accessing the central resource,
      a semaphore associated with accessing the central resource,
      an interrupt control associated with accessing the central resource, or
      a resource access control associated with accessing the central resource,
         the resource access control being governed by an operating system.

4. The method of claim 1, where identifying the resource includes:
   generating code based on the model,
   determining, based on generating the code, at least one of the task time information or the sample time information associated with the at least two tasks, and
   identifying the resource based on the at least one of the task time information or the sample time information.

5. The method of claim 1, further comprising:
   generating first code based on the model; and
   generating second code for applying the protection mechanism to the central resource,
      functions implemented by the second code being independent from functions of the model implemented by the first code.

6. A method comprising:
   identifying a plurality of resources subject to concurrent access by at least two tasks during an execution of a model of a multi-tasking dynamic system,
      each task, of the at least two tasks, being associated with respective task code to implement a functionality of the task during the execution of the model,
      identifying the plurality of resources being based on task time information or sample time information associated with the at least two tasks, and
      identifying the plurality of resources being performed by a computer;
   grouping the plurality of resources into a group,
      grouping the plurality of resources being performed by the computer;
   determining a protection mechanism to protect the group from being concurrently accessed by the at least two tasks during the execution of the model,
      determining the protection mechanism being performed by the computer;
   providing a user interface to enable a user to select the protection mechanism to protect the group by one or more of:
      selecting the protection mechanism from a list of protection mechanisms available for the group, or
      providing, via one or more input fields, input related to one or more of:
         a multi-tasking attribute associated with a real-time operating system,
         a hardware target, or
         a specified task, and
      identifying, based on the user selecting the protection mechanism, the protection mechanism for the group,
         identifying the protection mechanism being performed by the device;
   modifying the respective task code associated with each task of the at least two tasks to access the group to implement the functionality of the task during the execution of the model,
      modifying the respective task code being performed by the computer; and
   protecting the group with the protection mechanism during the execution of the model,
      protecting the group being performed by the computer.

7. The method of claim 6, where the identifying the plurality of resources includes:
identifying the plurality of resources during at least one of:
a compilation of code generated for the model,
a simulation of code generated for the model,
a generation of code generated for the model, or
an execution of code generated for the model.

8. The method of claim 6, where an implementation of the protection mechanism is configurable by the user via the user interface.

9. The method of claim 6, further comprising:
generating first code for the model; and
generating second code for implementing the protection mechanism,
the second code implementing the protection mechanism independent from functions of the model implemented by the first code.

10. The method of claim 9, where generating the second code includes:
generating the second code for implementing the protection mechanism in a particular target environment.

11. A system comprising:
a processor configured to:
identify a resource that is concurrently accessed by a plurality of tasks during an execution of a model of a multi-taking dynamic system,
each task of the plurality of tasks being associated with respective task code to implement a functionality of the task during the execution of the model, and
identifying the resource being based on task time information or sample time information associated with the plurality of tasks;
associate the resource with a central resource as a group;
modify, based on associating the resource with the central resource as the group, the task code associated with each task of the plurality of tasks to access the central resource to implement the functionality of the task during the execution of the model;
determine a protection mechanism to protect the central resource from being concurrently accessed by the plurality of tasks during the execution of the model,
when determining the protection mechanism, the processor being to:
provide a user interface to permit a user to select the protection mechanism by one or more of:
selecting the protection mechanism from a list of protection mechanisms available for the central resource, or
providing, via one or more input fields, an input related to one or more of:
a multi-tasking attribute associated with a real-time operating system,
a hardware target, or
a specified task of the plurality of tasks, and
identify, based on a user selection, the protection mechanism for the central resource; and
protect the central resource with the protection mechanism during the execution of the model.

12. The system of claim 11, where the protection mechanism is implemented independent from functions of the model.

13. A system comprising:
a processor configured to:
identify a plurality of resources that are concurrently accessed by a group of tasks during an execution of a model of a multi-tasking dynamic system,
each task, of the group of tasks, being associated with respective task code to implement a functionality of the task during the execution of the model, and
the plurality of resources being identified based on task time information or sample time information associated with the group of tasks;
group the plurality of resources into a group of resources;
modify, based on grouping the plurality of resources into the group of resources, the respective task code associated with each task of the group of tasks to access the group of resources to implement the functionality of the task during the execution of the model;
determine a protection mechanism to protect the group of resources from being concurrently accessed by the group of tasks during the execution of the model,
when determining the protection mechanism, the processor being to:
provide a user interface to permit a user to select the protection mechanism by one or more of:
selecting the protection mechanism from a list of protection mechanisms available for the group of resources,
providing an input via
an input field for accepting the input,
the input being related to one or more of:
a multi-tasking attribute associated with a real-time operating system,
a hardware target, or
a specified task of the group of tasks, and
identify, based on a user selection, the protection mechanism for the group of resources; and
protect the group of resources with the protection mechanism during the execution of the model.

14. The system of claim 13, where, when identifying the plurality of resources, the processor is configured to:
identify the plurality of resources during at least one of:
a compilation of code generated for the model,
a simulation of code generated for the model,
a generation of code generated for the model, or
an execution of code generated for the model.

15. The system of claim 13, where the processor is further configured to:
configure, based on the user selection, the protection mechanism for the group of resources.

16. The system of claim 13, where the processor is further configured to:
generate code that implements the protection mechanism independent from functions of the model.

17. A non-transitory storage medium storing instructions, the instructions comprising:
one or more instructions that, when executed by at least one computing device, cause the at least one computing device to:
identify a resource that is concurrently accessed by least two tasks during an execution of a model of a multi-tasking dynamic system,
each task, of the at least two tasks, being associated with respective task code to implement a functionality of the task during the execution of the model, and
the resource being identified based on task time information or sample time information associated with the at least two tasks;
associate the resource with a central resource as a group;
modify, based on associating the resource with the central resource as the group, the respective task code associated with each task of the at least two tasks to access the central resource to implement the functionality of the task during the execution of the model;

determine a protection mechanism to protect the central resource from being concurrently accessed by the at least two tasks during the execution of the model, the one or more instructions to determine the protection mechanism including one or more of:

one or more instructions to provide a user interface to permit a user to select the protection mechanism by one or more of:

selecting the protection mechanism from a list of protection mechanisms available for the central resource, or providing, via one or more input fields, an input related to a multi-tasking attribute associated with one or more of:

a real-time operating system, a hardware target associated with the execution of the model, or a specified task of the at least two tasks, and one or more instructions to identify, based on a user selection, the protection mechanism for the central resource; and protect the central resource with the protection mechanism during the execution of the model.

18. A non-transitory storage medium storing instructions, the instructions comprising:

one or more instructions that, when executed by at least one computing device, cause the at least one computing device to:

identify a plurality of resources that are concurrently accessed by at least two tasks during an execution of a model of a multi-tasking dynamic system, each task, of the at least two tasks, being associated with respective task code to implement a functionality of the task during the execution of the model, and the plurality of resources being identified based on task time information or sample time information associated with the at least two tasks;

group the plurality of resources into a group;

modify, based on grouping the plurality of resources into the group, the respective task code associated with each task of the two or more tasks to access the group to implement the functionality of the task during the execution of the model;

determine a protection mechanism to protect the group from being concurrently accessed by the at least two tasks during the execution of the model, the one or more instructions to determine the protection mechanism including:

one or more instructions to provide a user interface to permit a user to select the protection mechanism by at least one of:

selecting the protection mechanism from a list of protection mechanisms available for the group, or providing, via one or more input fields, input related to one or more of:

a multi-tasking attribute associated with a real-time operating system, a hardware target associated with the execution of the model, or a specified task of the at least two tasks, and one or more instructions to identify, based on a user selection, the protection mechanism for the group; and protect the group with the protection mechanism during the execution of the model.

\* \* \* \* \*